(12) United States Patent
Kozono

(10) Patent No.: US 12,534,100 B2
(45) Date of Patent: Jan. 27, 2026

(54) VEHICLE CONTROL DEVICE, VEHICLE CONTROL METHOD AND NON-TRANSITORY STORAGE MEDIUM

(71) Applicant: TOYOTA JIDOSHA KABUSHIKI KAISHA, Toyota (JP)

(72) Inventor: Yuki Kozono, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 18/510,994

(22) Filed: Nov. 16, 2023

(65) Prior Publication Data
US 2024/0270273 A1 Aug. 15, 2024

(30) Foreign Application Priority Data
Feb. 14, 2023 (JP) .................. 2023-020839

(51) Int. Cl.
| | |
|---|---|
| *B60W 50/14* | (2020.01) |
| *B60K 35/00* | (2024.01) |
| *B60K 35/235* | (2024.01) |
| *B60W 30/14* | (2006.01) |
| *B60W 30/16* | (2020.01) |
| *B60W 40/02* | (2006.01) |
| *B60K 35/10* | (2024.01) |

(Continued)

(52) U.S. Cl.
CPC ............ *B60W 50/14* (2013.01); *B60K 35/235* (2024.01); *B60W 30/143* (2013.01); *B60W 30/16* (2013.01); *B60W 40/02* (2013.01); *B60K 35/10* (2024.01); *B60K 35/29* (2024.01); *B60K 2360/1434* (2024.01); *B60K 2360/1468* (2024.01); *B60K 2360/1868* (2024.01); *B60W 2050/0083* (2013.01); *B60W 2050/146* (2013.01); *B60W 2554/802* (2020.02)

(58) Field of Classification Search
CPC ............ B60K 35/00; B60K 2360/1868; B60K 35/10; B60K 2360/1468; B60K 2360/1434; B60K 35/29; B60K 31/00; B60K 31/0008; B60W 50/14; B60W 40/02; B60W 30/143; B60W 30/16; B60W 2050/0083; B60W 2554/802; B60W 2050/146; G08G 1/00; G08G 1/0125; G08G 1/052; G05D 1/0223
USPC ........................................................ 701/96
See application file for complete search history.

(56) References Cited

U.S. PATENT DOCUMENTS

| | | | | |
|---|---|---|---|---|
| 6,116,369 A | * | 9/2000 | King | ................... B60K 31/0008 |
| | | | | 701/96 |
| 11,705,081 B2 | * | 7/2023 | Yamada | ................ B60K 35/22 |
| | | | | 345/593 |

(Continued)

FOREIGN PATENT DOCUMENTS

| | | | | |
|---|---|---|---|---|
| EP | 2599073 B1 | * | 9/2015 | ............. B60K 31/00 |
| JP | 2015-120362 A | | 7/2015 | |

*Primary Examiner* — Tuan C To
(74) *Attorney, Agent, or Firm* — SoraIP, Inc.

(57) ABSTRACT

When the vehicle executes adaptive cruise control in a state in which the inter-vehicle distance to the preceding vehicle is set to a set distance selected from a plurality of reference distances whose magnitude changes in units of the first change amount, setting a proposal unit capable of proposing to a vehicle occupant that the interval be changed by a second change amount smaller than the first change amount; and an input capable of executing an input operation capable of changing the set interval only by the second change amount.

3 Claims, 5 Drawing Sheets

(51) Int. Cl.
   *B60K 35/29* (2024.01)
   *B60W 50/00* (2006.01)

(56) References Cited

U.S. PATENT DOCUMENTS

| | | | |
|---|---|---|---|
| 12,084,055 B2* | 9/2024 | Namba | B60W 30/18154 |
| 2014/0176350 A1* | 6/2014 | Niehsen | B60W 50/085 |
| | | | 340/988 |
| 2019/0382011 A1* | 12/2019 | Bae | G06V 20/58 |
| 2023/0221569 A1* | 7/2023 | Ohyama | B60K 35/10 |
| | | | 701/523 |
| 2024/0083247 A1* | 3/2024 | Tsuda | B60K 35/00 |

* cited by examiner

| DATA ID | SET TIME | DETAILS OF CHANGES IN DRIVING ENVIRONMENT | TYPE OF IMAGE FOR INTERVAL ADJUSTMENT |
|---|---|---|---|
| 00001 | 1ST REFERENCE TIME | MOVE FROM A GENERAL ROAD TO A HIGHWAY IN LOW SPEED RANGE | 1ST IMAGE |
| 00002 | 3RD REFERENCE TIME | MOVE FROM HIGHWAY TO GENERAL ROAD WHILE STAYING ON HIGHWAY | 2ND IMAGE |
| 00003 | 3RD REFERENCE TIME | (OMISSION) | 2ND IMAGE |
| 00004 | 4TH REFERENCE TIME | (OMISSION) | 1ST IMAGE |
| 00005 | 4TH REFERENCE TIME | (OMISSION) | 3RD IMAGE |
| ... | ... | ... | ... |

VEHICLE CONTROL DEVICE, VEHICLE CONTROL METHOD AND NON-TRANSITORY STORAGE MEDIUM

CROSS-REFERENCE TO RELATED APPLICATION

This application claims priority to Japanese Patent Application No. 2023-020839 filed on Feb. 14, 2023 incorporated herein by reference in its entirety.

BACKGROUND

1. Technical Field

The present disclosure relates to a vehicle control device, a vehicle control method and a non-transitory storage medium.

2. Description of Related Art

Japanese Unexamined Patent Application Publication No. 2015-120362 (JP 2015-120362 A) below discloses a vehicle capable of executing adaptive cruise control (hereinafter abbreviated as ACC) that maintains an inter-vehicle distance from a preceding vehicle to be a set distance. A steering wheel of this vehicle is provided with a rotary selector that is an operating member for adjusting the set distance.

SUMMARY

In JP 2015-120362 A, the amount of change in the set distance is determined in accordance with the rotation speed of the rotary selector. Therefore, in JP 2015-120362 A, it is not easy for an occupant of the vehicle to operate the rotary selector so as to obtain his or her desired set distance.

In view of the above facts, it is an object of the present disclosure to provide a vehicle control device, a vehicle control method, and a non-transitory storage medium that allow an easy operation for setting an inter-vehicle interval used for ACC to a set interval desired by an occupant.

A vehicle control device according to an embodiment includes: a proposal unit that allows making a proposal to an occupant of a vehicle that a set interval is changed in a unit of a second amount of change smaller than a first amount of change when the vehicle executes adaptive cruise control in a state in which an inter-vehicle interval from a preceding vehicle is set to the set interval selected from a plurality of reference intervals whose magnitude changes in a unit of the first amount of change; and an input unit that allows performing an input operation that is able to change the set interval only in the unit of the second amount of change.

The "inter-vehicle interval" in embodiments and the specification includes inter-vehicle distance and inter-vehicle time.

The proposal unit of the vehicle control device according to an embodiment allows making a proposal to the occupant of the vehicle that the set interval is changed based on the second amount of change smaller than the first amount of change when the vehicle executes adaptive cruise control in the state in which the inter-vehicle interval from the preceding vehicle is set to the set interval selected from the plurality of reference intervals whose magnitude changes in the unit of the first amount of change. Further, the vehicle control device according to an embodiment includes the input unit that allows performing the input operation that is able to change the set interval only in the unit of the second amount of change. Therefore, the vehicle control device according to an embodiment can be easily operated so that the set interval desired by the occupant can be obtained.

The vehicle control device according to an embodiment further includes: a recording unit that records correlation data defining a relationship between a driving environment of the vehicle when the input operation is performed and a post-input set interval that is the set interval after the input operation is performed; and a response unit that allows performing a response process as to whether to approve a proposed change to the post-input set interval, the response unit being used by the occupant when the proposal unit determines that a predetermined change condition regarding the correlation data and the driving environment is satisfied based on the correlation data and the driving environment, and makes a proposal to the occupant to change the set interval to the post-input set interval represented by the correlation data for which the change condition is satisfied.

The proposal unit of the vehicle control device according to an embodiment makes a proposal to the occupant to change the set interval to the post-input set interval represented by the correlation data for which the change condition is satisfied, when the proposal unit determines that the change condition regarding the correlation data and the driving environment is satisfied based on the correlation data and the driving environment. Furthermore, the occupant can use the response unit to perform a response process as to whether to approve the proposed change to the post-input set interval. Therefore, when the change condition is satisfied, the occupant can use the response unit to change the set interval to the proposed post-input set interval.

The vehicle control device according to an embodiment further includes: a recording unit that records correlation data defining a relationship between a driving environment of the vehicle when the input operation is performed and a post-input set interval that is the set interval after the input operation is performed; and a control unit that changes, when the proposal unit determines that a predetermined change condition regarding the correlation data and the driving environment is satisfied based on the correlation data and the driving environment, the set interval to the post-input set interval represented by the correlation data for which the change condition is satisfied.

When the proposal unit of the vehicle control device according to an embodiment determines that the change condition regarding the correlation data and the driving environment is satisfied based on the correlation data and the driving environment, the control unit changes the set interval to the post-input set interval represented by the correlation data for which the change condition is satisfied. Therefore, when the change condition is satisfied, the vehicle control device can automatically change the set interval to a value that suits the occupant's preference.

A vehicle control method according to an embodiment includes the steps of: making a proposal to an occupant of a vehicle that a set interval is changed in a unit of a second amount of change smaller than a first amount of change when the vehicle executes adaptive cruise control in a state in which an inter-vehicle interval from a preceding vehicle is set to the set interval selected from a plurality of reference intervals whose magnitude changes in a unit of the first amount of change; and controlling an input unit to allow performing an input operation that is able to change the set interval only in the unit of the second amount of change.

A non-transitory storage medium stores a program according to an embodiment. The program causes a computer to execute: a process of making a proposal to an occupant of a vehicle that a set interval is changed in a unit of a second amount of change smaller than a first amount of change when the vehicle executes adaptive cruise control in a state in which an inter-vehicle interval from a preceding vehicle is set to the set interval selected from a plurality of reference intervals whose magnitude changes in a unit of the first amount of change; and a process of controlling an input unit to allow performing an input operation that is able to change the set interval only in the unit of the second amount of change.

As described above, the vehicle control device, the vehicle control method, and the non-transitory storage medium according to the present disclosure have an excellent effect that the operation for setting the inter-vehicle interval used for ACC to the set distance desired by the occupant is easy.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of a vehicle control device 10, a vehicle control method, and a non-transitory storage medium according to the present disclosure will be described below with reference to the drawings.

Figure 1:
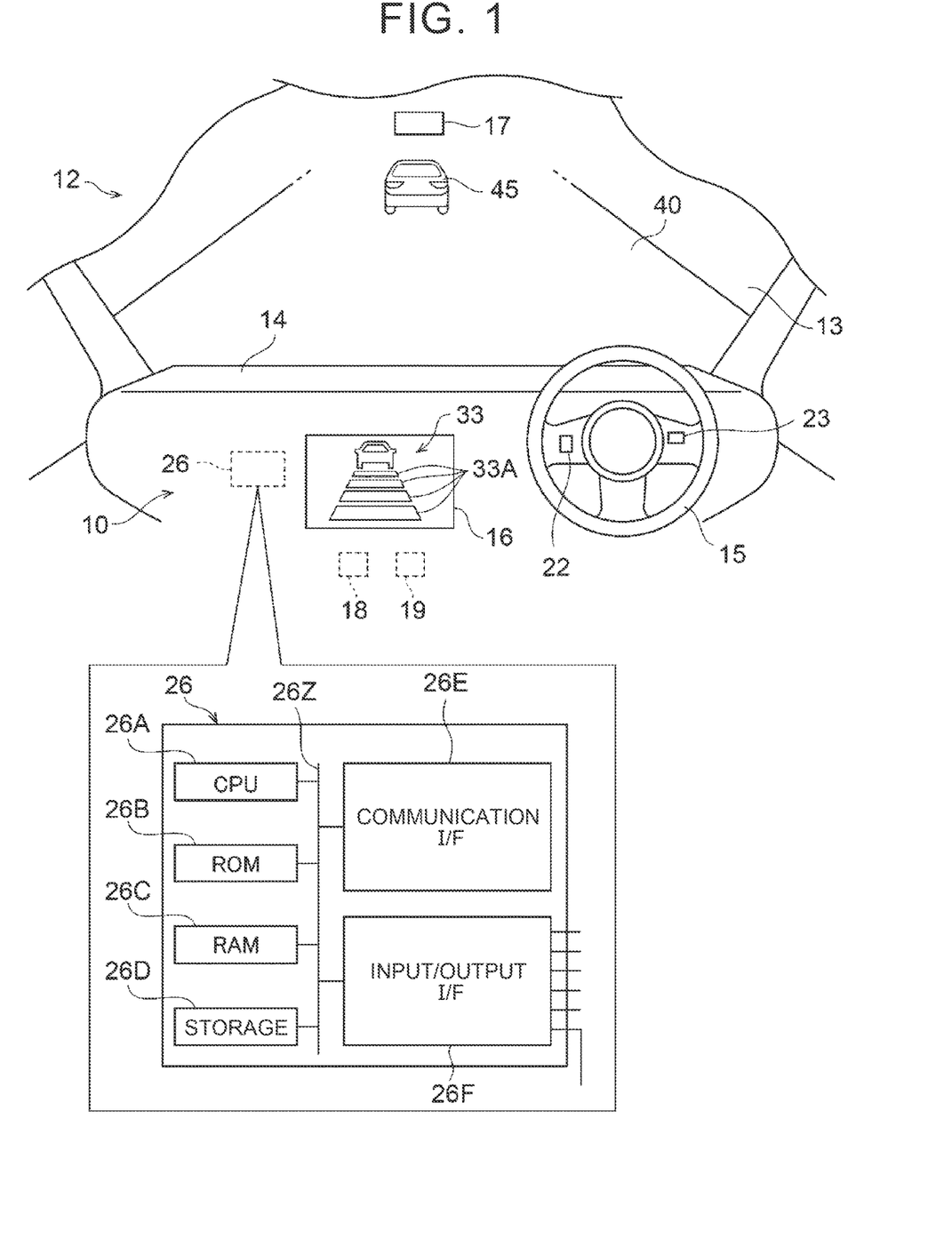
FIG. 1 is a diagram showing the interior of a vehicle equipped with a vehicle control device according to an embodiment.

A vehicle 12 equipped with the vehicle control device 10 includes a front windshield 13 and an instrument panel 14 as shown in FIG. 1. A steering wheel 15 is rotatably supported on the instrument panel 14. Further, the instrument panel 14 is provided with a display (input section) (response section) 16. A touch panel is provided on the surface of the display 16.

A sensor group 17 is provided on the front windshield 13. The sensor group 17 includes, for example, a millimeter-wave radar that transmits search waves and receives reflected waves, a Laser Imaging Detection and Ranging (LiDAR) that scans the front of the vehicle 12, and a camera that captures objects around the vehicle 12.

As shown in FIG. 1, vehicle 12 has a Global Navigation Satellite System (GNSS) receiver 18. The GNSS receiver 18 receives GNSS signals transmitted from GNSS satellites, thereby obtaining information about the position where the vehicle 12 is traveling (hereinafter referred to as "position information"). Furthermore, the vehicle 12 is provided with a vehicle speed sensor 19.

As shown in FIG. 1, the steering wheel 15 is provided with an ACC switch 22 and an interval setting switch 23. The ACC switch 22 and the interval setting switch 23 are push-button switches.

As shown in FIG. 1, the vehicle 12 has an Electronic Control Unit (ECU) 26 as a hardware configuration.

The ECU 26 includes a Central Processing Unit (CPU) (control unit) (proposal unit) (computer) 26A, Read Only Memory (ROM) 26B, Random Access Memory (RAM) 26C, storage (recording unit) 26D, communication I/F 26E and input/output I/F 26F. The CPU 26A, ROM 26B, RAM 26C, storage 26D, communication I/F 26E and input/output I/F 26F are communicably connected to each other via an internal bus 26Z.

The CPU 26A is a central processing unit that executes various programs and controls each section. The CPU 26A reads a program from the ROM 26B or the storage 26D and executes the program using the RAM 26C as a work area. The CPU 26A controls each component and performs various arithmetic processing according to programs recorded in the ROM 26B or the storage 26D. The CPU 26A can obtain information about time from the timer.

The ROM 26B stores various programs and various data. RAM 26C temporarily stores programs or data as a work area. The storage 26D is configured by a storage device such as a Hard Disk Drive (HDD) or Solid State Drive (SSD), and stores various programs and various data. For example, in ROM 26B or storage 26D is installed a navigation application with map data. That is, the vehicle 12 is equipped with a navigation system. The ROM 26B and the storage 26D are an example of a non-transitory storage medium.

The communication I/F 26E is an interface for connecting to an ECU (not shown) other than the ECU 26 via an external bus (not shown). The interface uses, for example, a CAN protocol communication standard.

The input/output I/F 26F is an interface for communicating with various devices. These devices include, for example, a sensor group 17, a GNSS receiver 18, a vehicle speed sensor 19, an ACC switch 22, an interval setting switch 23, and an actuator cluster (described below).

Figure 2:
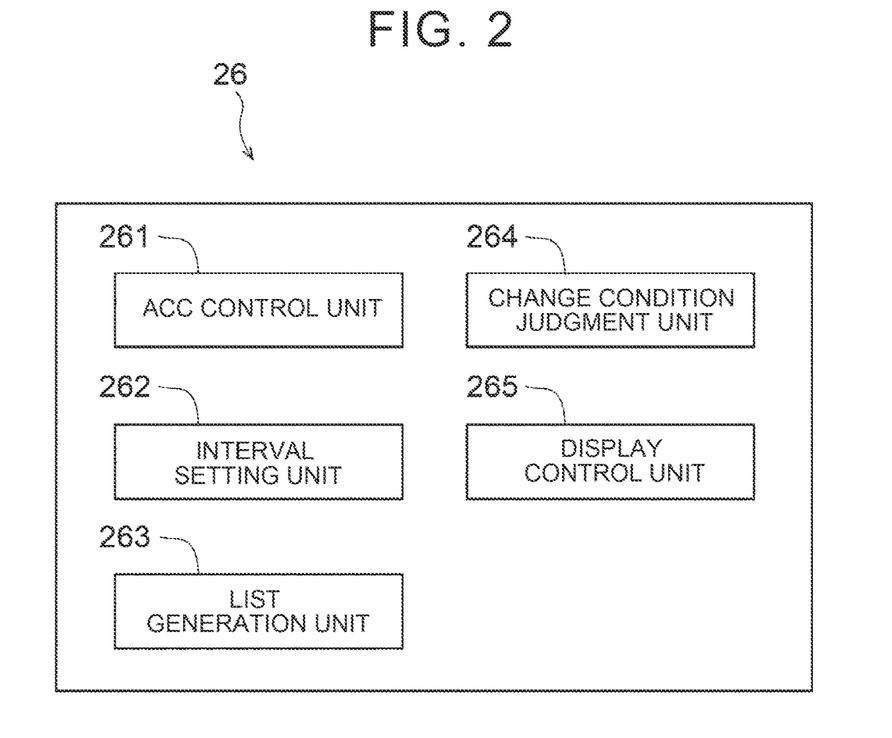
FIG. 2 is a functional block diagram of the ECU shown in FIG. 1.

FIG. 2 shows an example of the functional configuration of the ECU 26 in a block diagram. The ECU 26 has an ACC control unit 261, an interval setting unit 262, a list generation unit 263, a change condition determination unit 264, and a display control unit 265 as functional configurations. The ACC control unit 261, the interval setting unit 262, the list generation unit 263, the change condition determination unit 264, and the display control unit 265 are implemented by the CPU 26A reading and executing programs stored in the ROM 26B.

The ACC control unit 261 causes the vehicle 12 to perform ACC (adaptive cruise control) using a sensor group 17 and a group of actuators provided in the vehicle 12 when the ACC switch 22 is turned on. That is, the ACC control unit 261 the actuator group so that the time interval between the vehicle 12 and the preceding vehicle 45 (see FIG. 1) positioned immediately in front of the vehicle 12 is maintained at the set time (set interval), which is the set time interval. The actuator group includes various electric actuators for driving the internal combustion engine, which is the brake device and the drive source, and an electric motor, which is the drive source.

The interval setting unit 262 sets (adjusts) the set time when the interval setting switch 23 is operated while the vehicle 12 is executing ACC, or when a touch operation (input operation) is performed on an interval adjustment image 35 (described later) displayed on the display 16. Detailed functions of the interval setting unit 262 (CPU 26A) will be described later.

When a touch operation is performed on the interval adjustment image 35, the list generation unit 263 generates correlation data, which will be described later, and records the generated correlation data in the storage 26D. Furthermore, when the amount of correlation data recorded in the storage 26D reaches a sufficient amount, the list generation unit 263 creates (updates) a determination list 30, which will be described later, based on the correlation data.

The change condition determination unit 264 determines whether a first change condition or a second change condition (change condition), which will be described later, is satisfied when the vehicle 12 executes ACC.

A display control unit 265 controls the display 16. For example, the display control unit 265 causes the display 16 to display a first set time image 33, a second set time image 34, and an interval adjustment image 35, which will be described later.

The display 16, the sensor group 17, the GNSS receiver 18, the vehicle speed sensor 19, the ACC switch 22, the interval setting switch 23, the ECU 26 and the actuator group are components of the vehicle control device 10.

Action and Effect

Next, the operation and effects of this embodiment will be described.

Next, processing executed by the CPU 26A of the ECU 26 will be described. The CPU 26A repeatedly executes the processing of the flowchart shown in FIGS. 5 and 6 each time a predetermined time elapses.

It is assumed that the vehicle 12 is traveling forward on the road 40 shown in FIG. 1, and the preceding vehicle 45 located immediately in front of the vehicle 12 is traveling forward on the road 40. First, the processing of the flowchart of FIG. 5 will be described.

Figure 5:
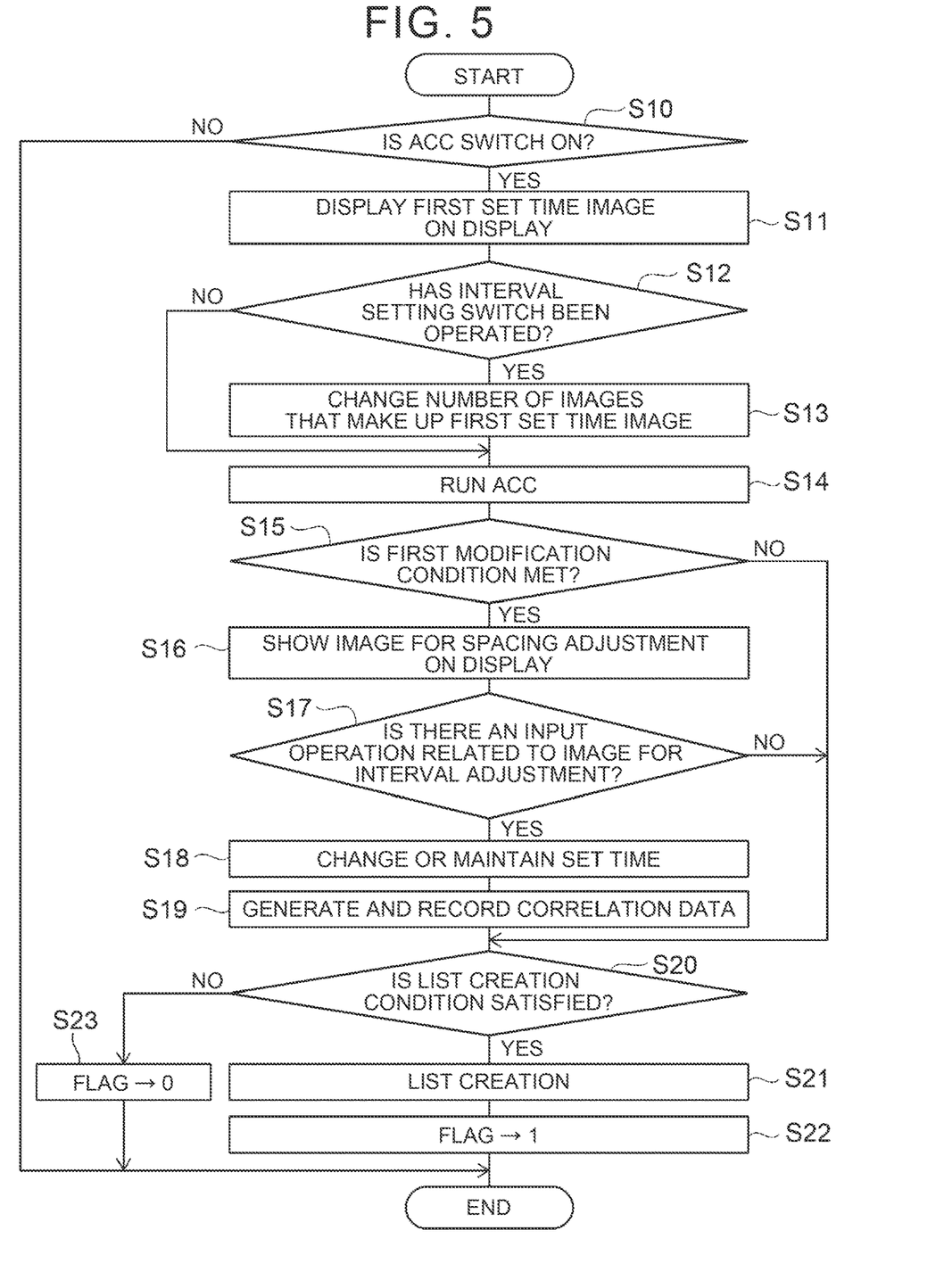
FIG. 5 is a flowchart showing processing executed by the CPU of the ECU.

In S10 (hereinafter, step characters are omitted), the CPU 26A determines whether or not the ACC switch 22 has been turned on.

If the determination in S10 is Yes, the CPU 26A proceeds to S11 and causes the display 16 to display the first set time image 33 (see FIG. 1).

As shown in FIG. 1, the first set time image 33 of this embodiment is composed of at least one image 33A linearly extending in the horizontal direction. The first set time image 33 of the present embodiment is composed of up to four images 33A. However, the maximum number of images 33A included in the first set time image 33 may be a plurality other than four. As the number of images 33A displayed on the display 16 increases, the set time between the vehicle 12 and the preceding vehicle 45 increases. Here, the set time for one image 33A is defined as a first reference time (reference interval) DS1, the set time for two images 33A is defined as a second reference time (reference interval) DS2, the set time for three images 33A is defined as a third reference time (reference interval) DS3, and the set time for four images 33A is defined as a fourth reference time (reference interval) DS4. The difference between the first reference time DS1 and the second reference time DS2, the difference between the second reference time DS2 and the third reference time DS3, and the difference between the third reference time DS3 and the fourth reference time DS4 are first variations. Note that each first change amount may be the same as or different from each other. For example, the first reference time DS1 is 4.0 seconds, the second reference time DS2 is 6.0 seconds, the third reference time DS3 is 8.0 seconds, and the fourth reference time DS4 is 10.0 seconds.

After completing the processing of S11, the CPU 26A proceeds to S12, and determines whether the driver (passenger, not shown) of the vehicle 12 has operated the interval setting switch 23.

If the determination in S12 is Yes, the CPU 26A proceeds to S13, and changes the number of images 33A forming the first set time image 33 according to the number of times the interval setting switch 23 has been operated. In this embodiment, the number of images 33A increases by one each time the interval setting switch 23 is operated once. When the interval setting switch 23 is operated once when the number of images 33A is the maximum number (4), the number of images 33A is changed to the minimum number (1).

When the processing of S13 is finished or when it is determined as No in S12, the CPU 26A proceeds to S14, and executes ACC so that the inter-vehicle time between the vehicle 12 and the preceding vehicle 45 becomes the set time determined by the number of images 33A displayed on the display 16.

When the processing of S14 is finished, the CPU 26A proceeds to S15 and determines whether the first change condition is satisfied based on the change in the running environment of the vehicle 12. Here, the running environment of the vehicle 12 includes the type of road on which the vehicle 12 is running obtained from the navigation system and the type of vehicle speed of the vehicle 12 obtained from the vehicle speed sensor 19. The types of roads include, for example, general roads and highways. Also, the type of road can be acquired by the CPU 26A, for example, based on map data and position information included in the navigation system. The vehicle speed is obtained from the vehicle speed sensor 19 by the CPU 26A. The types of vehicle speed are defined by four types, i.e., a very low speed range, a low speed range, a medium speed range, and a high speed range. Note that when the road on which the vehicle 12 is traveling is congested, the vehicle speed of the vehicle 12 tends to be in a very low speed range. The CPU 26A determines that the first change condition is met when a predetermined change occurs in the combination of road type and vehicle speed type. For example, the first change condition is met when the type of vehicle speed changes from the high speed range to the medium speed range while traveling on an expressway. Further, for example, the first change condition is satisfied when the vehicle 12 moves from the general road to the expressway while the vehicle speed is maintained in the low speed range.

Figure 3:
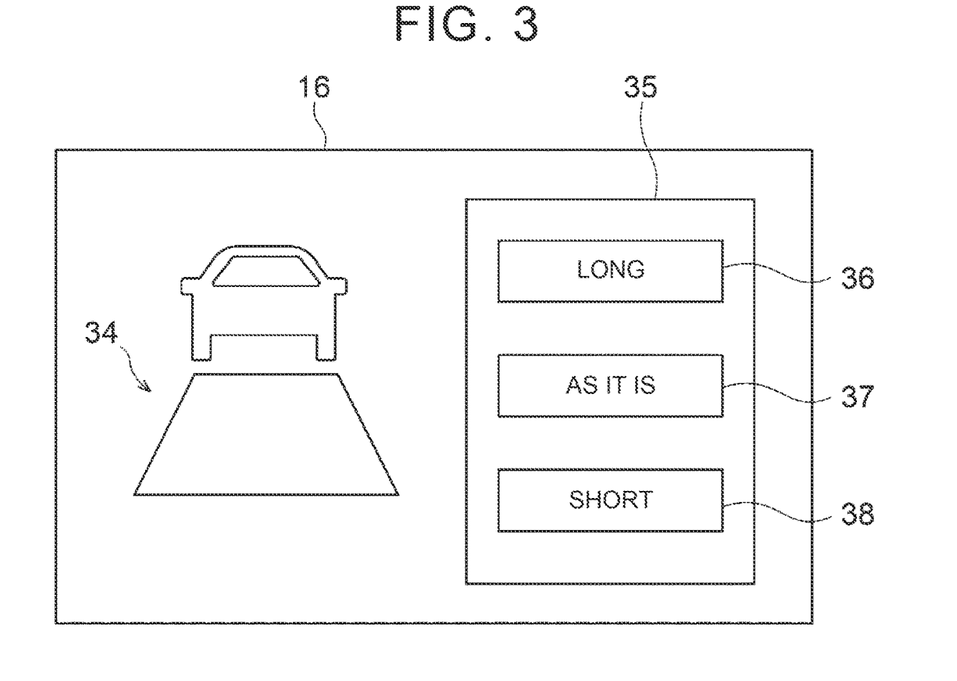
FIG. 3 is a diagram showing the display shown in FIG. 1.

If the determination in S15 is Yes, the CPU 26A proceeds to S16 and causes the display 16 to display the interval adjustment image 35 shown in FIG. 3 for a predetermined period of time. The interval adjustment image 35 includes a first image 36, a second image 37 and a third image 38.

When the processing of S16 is completed, the CPU 26A proceeds to S17 and determines whether or not the driver has performed a touch operation (input operation) on the interval adjustment image 35 displayed on the display 16 within the predetermined time.

If it is determined as Yes in S17, the CPU 26A proceeds to S18, and changes or maintains the set time according to the type of the image (the first image 36, the second image 37 and the third image 38) touched in S17.

For example, when the touch operation is performed on the first image 36 in S17, the set time is set longer by a second amount of change that is smaller than the first amount of change. The second amount of change is, for example, 0.2 seconds. For example, when the set time is set to the third reference time DS3 at the processing time of S16, the set time is longer than the third reference time DS3 by the second change amount. At this time, the CPU 26A causes the display 16 to display the second set time image 34 instead of the first set time image 33 as shown in FIG. 3. In this case, the vertical dimension (height) of the second set time image 34 is larger than the vertical dimension (height) of the first set time image 33 when there are three images 33A, and smaller than the vertical dimension of the first set time image 33 when there are four images 33A.

For example, when the second image 37 is touch-operated in S17, the set time is maintained. For example, if the set time is set to the second reference time DS2 at the processing time of S16, the set time is maintained at the second reference time DS2. In this case, the first set time image 33 remains displayed on the display 16.

For example, when the third image 38 is touch-operated in S17, the set time is shortened by the second amount of change. For example, when the set time is set to the second reference time DS2 at the processing time of S16, the set time is shorter than the second reference time DS2 by the second change amount. At this time, the CPU 26A causes the display 16 to display the second set time image 34 instead of the first set time image 33. In this case, the vertical dimension of the second set time image 34 is smaller than the vertical dimension of the first set time image 33 when there are two images 33A, and the vertical dimension of the first set time image 33 when there is one image 33A. Greater than dimension.

It should be noted that when the process of S13 is executed again after this, the first set time image 33 is displayed on the display 16 again. For example, in the case where the display 16 displays the second set time image 34 whose vertical dimension is larger than the first set time image 33 having three images 33A and smaller than the first set time image 33 having four images 33A, when the interval setting switch 23 is operated once, the display 16 displays the first set time image 33 having four images 33A.

When the process of S18 is executed, the CPU 26A executes ACC so that the inter-vehicle time between the vehicle 12 and the preceding vehicle 45 becomes the set time set in S18.

When the processing of S18 is finished, the CPU 26A proceeds to S19. The CPU 26A generates correlation data representing a relationship among the set times (first reference time DS1, second reference time DS2, third reference time DS3, fourth reference time DS4) specified by the first set time image 33 immediately before the process of S17 is executed, the content of changes in the driving environment of the vehicle 12 when the process of S17 is executed, the types of images (first image 36, second image 37 and third image 38) touched in S17, and records the data in the storage 26D. At this time, the CPU 26A records the correlation data in the storage 26D while associating the driver with the correlation data. For example, when the vehicle 12 is operated using a digital key, the driver's identification (ID) information included in this digital key is associated with the correlation data. Also, when the vehicle 12 is operated using a mechanical key, the ID information of the person (driver) who uses this key recognized by the CPU 26A is associated with the correlation data.

When the processing of S19 is completed, or when the determination of No is made in S17, the CPU 26A proceeds to S20 and determines whether the predetermined list creation condition is satisfied. It should be noted that when the determination in S17 is No, the interval adjustment image 35 is erased from the display 16.

The list creation condition is met when the total amount of correlation data recorded in the storage 26D and related to a predetermined change in driving environment reaches a predetermined amount. For example, when the vehicle 12 for which the set time is set to the first reference time experiences a first specific change, which is a change in the driving environment, such as "moved from a general road to a highway in a low-speed range". Assume that the vehicle 12 whose time is set to the third reference time undergoes a second specific change, which is a change in the driving environment, such as "moving from the highway to the general road while still in the highway." When the first specific change has occurred a predetermined number of times or more, and the total number of times the occupant has selected the first image 36 displayed on the display 16 when the first specific change has occurred has reached a threshold number of times or more, the listing condition is met with respect to the correlation data associated with this first specified change. In addition, the second specific change occurs a predetermined number of times or more, and the total number of times the occupant selects the second image 37 displayed on the display 16 when the second specific change occurs exceeds the threshold number of times. Sometimes, the listing condition is met with respect to the correlation data associated with this second specified change. The threshold number of times is, for example, five times. However, the threshold number of times may be a number of times other than five.

Figure 4:
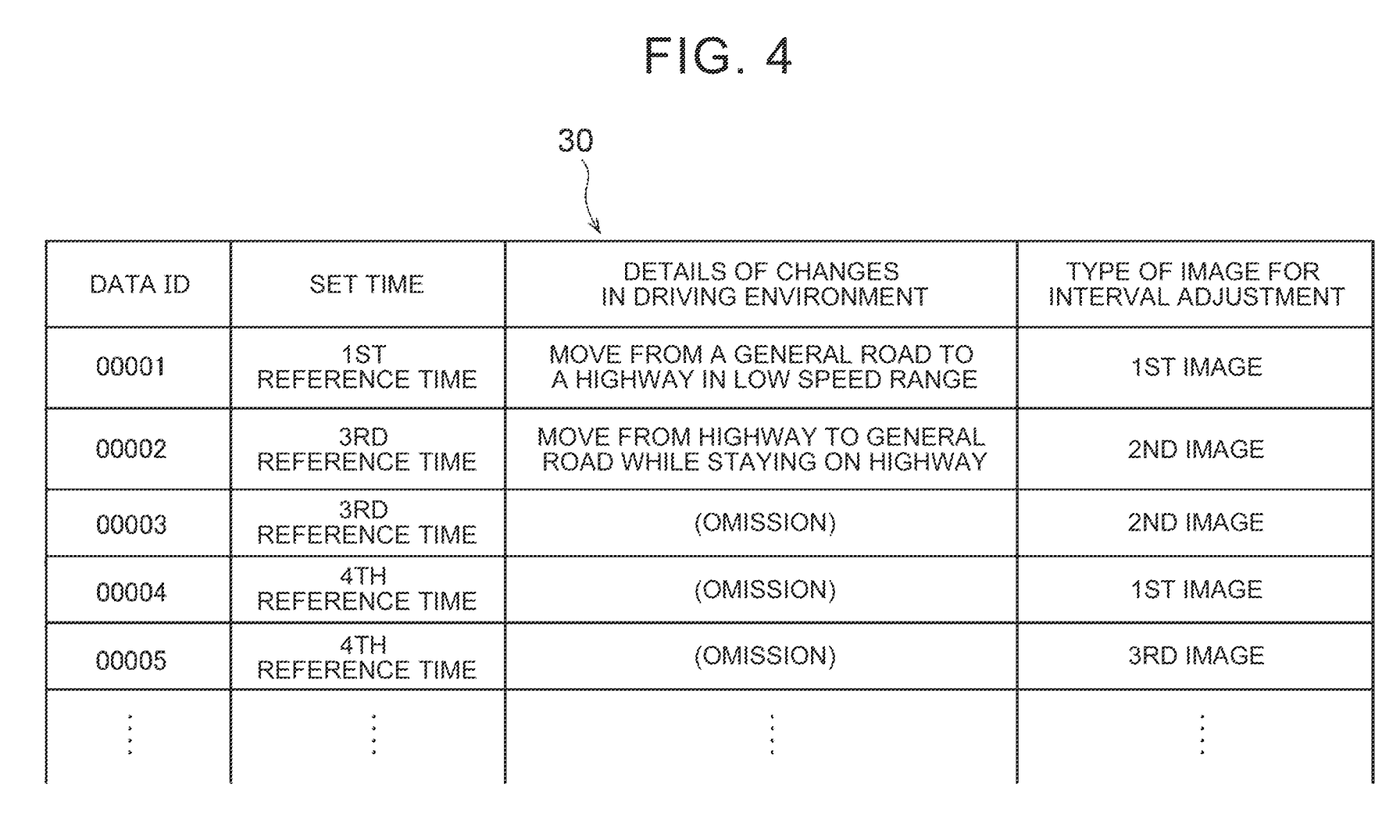
FIG. 4 is a diagram showing a judgment list.

If the determination in S20 is Yes, the CPU 26A proceeds to S21, creates the determination list 30 shown in FIG. 4 based on the correlation data recorded in the storage 26D, and records the determination list 30 in the storage 26D. The determination list 30 is created in association with the driver's ID information. Further, the determination list 30 is defined by the data ID representing each correlation data, the set time defined by the first set time image 33, the content of the change in the driving environment, and the type of the touch-operated interval adjustment image 35. For example, when the first specific change occurs a predetermined number of times or more and the total number of times the first image 36 is selected is a threshold number of times or more, the determination list 30 is created (updated) based on the correlation data with the data ID of 00001. In addition, when the second specific change occurs a predetermined number of times or more and the total number of times the second image 37 is selected becomes a threshold number of times or more, the determination list 30 is created (updated) based on the correlation data with the data ID of 00002.

When the processing of S21 is finished, the CPU 26A proceeds to S22 and sets the value of the flag to "1". Note that the initial value of the flag is "0".

On the other hand, if the determination in S20 is No, the CPU 26A proceeds to S23 and sets the value of the flag to "0".

When the determination in S10 is No, or when the processing of S22 and S23 is finished, the CPU 26A once ends the processing of the flowchart of FIG. 5.

Next, the processing of the flowchart of FIG. 6 will be described.

In S30, the CPU 26A determines whether ACC is being executed.

If it is determined as Yes in S30, the CPU 26A proceeds to S31 and determines whether the value of the flag is "1".

If it is determined Yes in S31, the CPU 26A proceeds to S32 and determines whether or not a predetermined second change condition is satisfied with respect to the correlation data and changes in the driving environment. That is, the setting time and the change in the driving environment represented by the correlation data of any data ID included in the determination list 30 associated with the ID information of the driver who is operating the vehicle 12 are determined by the process of S32. The second change condition is met when the set time of the vehicle 12 at the time and the details of the change in the driving environment are matched. For example, when the set time and the content of the change in the driving environment match the correlation data with ID "0001", the CPU 26A determines that the second change condition is satisfied.

If determined as Yes in S32, the CPU 26A proceeds to S33. For example, if the second change condition is established for the correlation data with the data ID "00001" in S32, the display 16 displays a second set time image (set interval after input) 34 and a response image (not shown). The response image includes an image of "Is this inter-vehicle time OK? Yes or No". The second set time image 34 in this case represents a time longer than the first reference time DS1 by the second change amount. Therefore, the vertical dimension of the second set time image 34 is larger than the vertical dimension of the first set time image 33 when there is one image 33A, and smaller than the vertical dimension of the first set time image 33 when there are two images 33A. Further, for example, when the second change condition is established for the correlation data with the data ID of "00002" in S32, the first set time image (post-input set interval) 33 having three images 33A on the display 16 and the response image are displayed.

When the process of S33 is completed, the CPU 26A proceeds to S34 and determines whether or not the Yes image of the response image has been touched.

If the determination in S34 is YES, the CPU 26A proceeds to S35, ACC is executed so that the time interval between the vehicle 12 and the preceding vehicle 45 becomes the second set time image 34 proposed to the occupant by the display 16 in S33 or the inter-vehicle time represented by the first set time image 33. Note that when the touch operation is performed on the No image of the response image, the CPU 26A determines No in S34.

Figure 6:
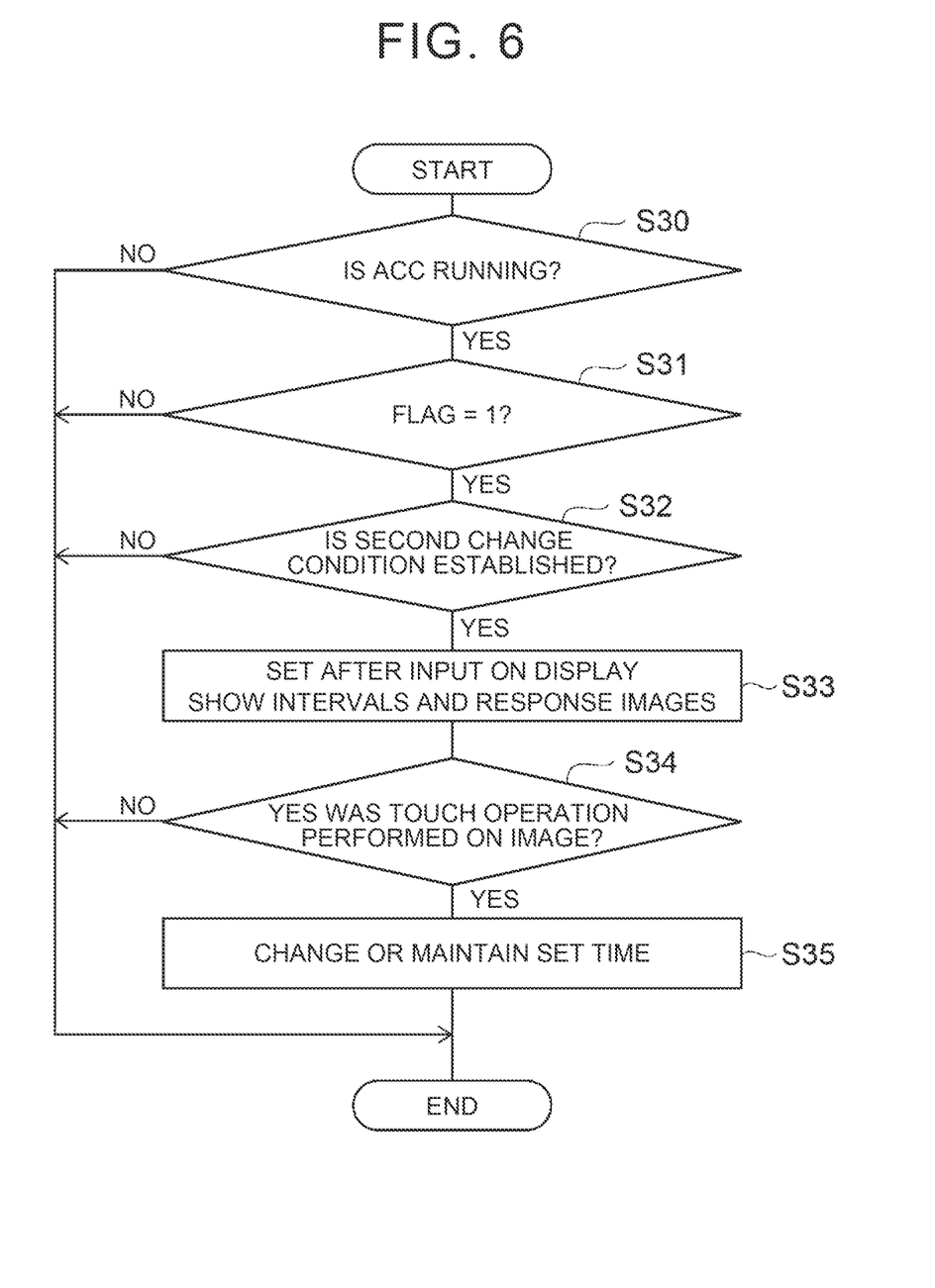
FIG. 6 is a flowchart showing processing executed by the CPU.

When it is determined No in S30, 31, 32, or 34, or when the process of S35 is finished, the CPU 26A once ends the process of the flowchart of FIG. 6.

As described above, in the present embodiment, when the vehicle performs ACC with the inter-vehicle time between the vehicle 12 and the preceding vehicle 45 set to the set time selected from a plurality of reference times (first reference time DS1, second reference time DS2, third reference time DS3, fourth reference time DS4), it can be suggested to the driver to change the set time by the second variation unit. The difference between each reference time is a first variation, and the second variation is less than the first variation. Furthermore, the occupant can perform an operation (input operation) to change the set time only in units of the second amount of change with respect to the interval adjustment image 35 displayed on the display 16. Therefore, the driver can easily operate the interval adjustment image 35 (display 16) so that the inter-vehicle time becomes the set time desired by the driver.

Although the vehicle control device 10, the vehicle control method, and the program according to the embodiment have been described above, design changes can be made as appropriate without departing from the gist of the present disclosure.

For example, when the second change condition is satisfied, the image types of the interval adjustment image 35 included in the correlation data satisfying the second change condition (first image 36, second image 37, and third image 38), the CPU 26A may change the set time. According to this modification, when the second change condition is satisfied, the set time can be automatically changed to a value that suits the driver's preference. Therefore, the vehicle control device 10 of this modified example can reduce the burden on the driver.

The driving environment of the vehicle 12 may include factors other than the type of road and the type of vehicle speed of the vehicle 12. For example, the driving environment includes time information, information on the location where the vehicle 12 is traveling (location information), information on the country having the location, information on the season, information on the weather (including the outside temperature), and start of the vehicle 12. At least one of information about the distance traveled since the button (ignition switch) was turned on and shape information of the road on which the vehicle is traveling may be included. The road shape information includes, for example, information indicating that the road is linear and information indicating that the road is curved. The shape information of the road can be acquired (calculated) by the CPU 26A based on the detected value of a steering angle sensor (not shown) that detects the steering angle of the steering wheel 15.

The ACC switch 22 and the interval setting switch 23 may be images displayed on the display 16.

The interval setting switch 23 may be a two-way switch having a first operating portion and a second operating portion. In this case, the number of images 33A increases by one each time the first operation section is operated once, and the number of images 33A decreases by one each time the second operation section is operated once.

The vehicle 12 may include a heads-up display device capable of forming the first set time image 33, the second set time image 34 (and the response image), and the interval adjustment image 35.

When the interval adjustment image 35 is displayed on the display 16 or when the interval adjustment image 35 is formed by the head-up display device, the occupant uses a mechanical switch provided on the vehicle 12 to select the first image 36, the second image 37 and the third image 38 may be selected. This switch can be provided on the steering wheel 15, for example. Further, when the second set time image 34 and the response image are displayed on the display 16 or when the second set time image 34 and the response image are formed by the head-up display device, the occupant can use the mechanical switch to An input operation may be performed to select the Yes image.

Further, when the interval adjustment image 35 is displayed on the display 16 or when the interval adjustment image 35 is formed by the head-up display device, the occupant may perform an input operation using gestures or voice. For example, a camera provided in the vehicle 12 photographs the occupant, and the CPU 26A analyzes the gestures included in the obtained photographed data to obtain a first image 36, a second image 37 and a third image 38. You may perform the process which selects either. Also, the occupant inputs his/her voice into a microphone provided in the vehicle 12, and the CPU 26A analyzes the acquired voice data to determine which of the first image 36, second image 37 and third image 38. You may perform the process which selects either.

When it is determined Yes in S32 with respect to the correlation data of the predetermined data ID and the process of S34 has been executed a predetermined number of times or more, and when it is determined Yes in S32 with respect to this correlation data, the CPU 26A performs S34 The process of S35 may be executed without going through the process of.

Alternatively, the ACC control unit 261 may perform ACC based on a set distance (set interval) that is the inter-vehicle distance between the vehicle 12 and the preceding vehicle 45. In this case, the display 16 can display the first set distance image in the same form as the first set time image 33, the second set distance image in the same form as the second set time image 34, and the interval adjustment image 35. In this case, the set distance when there is one image 33A is the first reference distance (reference interval), the set distance when there are two images 33A is the second reference distance (reference interval), and the case where there are three images 33A is defined as a third reference distance (reference interval), and the set distance when there are four images 33A is defined as a fourth reference distance (reference interval). The difference between the first reference distance and the second reference distance, the difference between the second reference distance and the third reference distance, and the difference between the third reference distance and the fourth reference distance are the first variations. For example, the first reference distance is 20 m, the second reference distance is 40 m, the third reference distance is 60 m, and the fourth reference distance is 80 m. Furthermore, when the first image 36 or the third image 38 displayed on the display 16 is selected, the set distance changes by a second amount of change smaller than the first amount of change. The second amount of change in this case is, for example, 2 m.

A second set time image 34 (and a response image), a second set distance image (and a response image), and an interval adjustment image 35 may be displayed on a touch panel display of an operation terminal (for example, a smartphone) capable of wirelessly communicating with the ECU 26. In this case, when a touch operation is performed on the Yes image or the interval adjustment image 35, a predetermined wireless signal is transmitted from the operation terminal to the ECU 26, and the set time is changed or maintained in units of the second change amount.

What is claimed is:

1. A vehicle control device comprising:
   a display configured to display a graphical display element on a screen of the display, the graphical display element being configured to receive an input operation by a user to change a first inter-vehicle distance between a vehicle and a preceding vehicle; and
   a processor configured to
   execute adaptive cruise control of the vehicle,
   set the first inter-vehicle distance between the vehicle and the preceding vehicle, and
   change the first inter-vehicle distance to a second inter-vehicle distance by a change amount smaller than the first inter-vehicle distance in response to receiving the input operation on the graphical display element.

2. A vehicle control method comprising:
   displaying a graphical display element on a screen of a display, the graphical display element being configured to receive an input operation by a user to change a first inter-vehicle distance between a vehicle and a preceding vehicle;
   executing adaptive cruise control of the vehicle;
   setting the first inter-vehicle distance between the vehicle and the preceding vehicle; and
   changing the first inter-vehicle distance to a second inter-vehicle distance by a change amount smaller than the first inter-vehicle distance in response to receiving the input operation on the graphical display element.

3. A non-transitory storage medium storing instructions that are executable by a computer and that cause the computer to execute functions comprising:
   displaying a graphical display element on a screen of a display, the graphical display element being configured to receive an input operation by a user to change a first inter-vehicle distance between a vehicle and a preceding vehicle;
   executing adaptive cruise control of the vehicle;
   setting the first inter-vehicle distance between the vehicle and the preceding vehicle; and
   changing the first inter-vehicle distance to a second inter-vehicle distance by a change amount smaller than the first inter-vehicle distance in response to receiving the input operation on the graphical display element.

* * * * *